United States Patent [19]

Schäper

[11] 4,434,121

[45] Feb. 28, 1984

[54] METHOD FOR PRODUCTION OF A HELICAL SPRING FROM A FIBER-REINFORCED PLASTIC

[75] Inventor: Siegfried Schäper, Wettstetten, Fed. Rep. of Germany

[73] Assignee: Audi Nsu Auto Union Aktiengesellschaft, Neckarsulm, Fed. Rep. of Germany

[21] Appl. No.: 307,590

[22] Filed: Oct. 1, 1981

[51] Int. Cl.³ .............................................. B29F 3/10
[52] U.S. Cl. .................................... 264/174; 264/136; 264/281; 264/339
[58] Field of Search ............... 264/134, 136, 137, 174, 264/281, 339; 425/319, 392, 393

[56] References Cited

U.S. PATENT DOCUMENTS

| | | | |
|---|---|---|---|
| 2,393,058 | 1/1946 | Pierce et al. | 264/281 |
| 3,537,937 | 11/1970 | Medney | 264/174 |
| 3,637,447 | 1/1972 | Berger et al. | 264/137 |
| 3,651,195 | 3/1972 | Rasmussen | 264/136 |
| 3,859,409 | 1/1975 | Coonrod | 264/137 |
| 3,862,287 | 1/1975 | Davis | 264/134 |
| 4,115,498 | 9/1978 | Kissell et al. | 264/137 |
| 4,131,759 | 12/1978 | Felkel | 264/174 |
| 4,181,486 | 1/1980 | Saito | 264/174 |
| 4,260,143 | 4/1981 | Kliger | 267/148 |

FOREIGN PATENT DOCUMENTS 3000520 7/1980 Fed. Rep. of Germany.

Primary Examiner—Donald E. Czaja
Assistant Examiner—W. Thompson
Attorney, Agent, or Firm—Karl F. Ross; Herbert Dubno

[57] ABSTRACT

The invention relates to a method and an apparatus for the production of a helical spring from fiber-reinforced plastic, where a strand of fibers and plastic resin is wound onto a rotationally symmetric rotor provided with a spiral groove then hardened and finally removed from the rotor. In order to be able to produce helical springs with desired and in particular circular cross sections of the strand with small tolerances of the shape, a stator with an inner spiral groove is surroundingly disposed around the rotor, which spiral groove together with the spiral grooves of the rotor form the cross-sectional profile of the strand, where the rotor and the stator relative to the rotation of the rotor are shifted axially with respect to each other in an amount corresponding to the slope of the spiral grooves.

5 Claims, 1 Drawing Figure

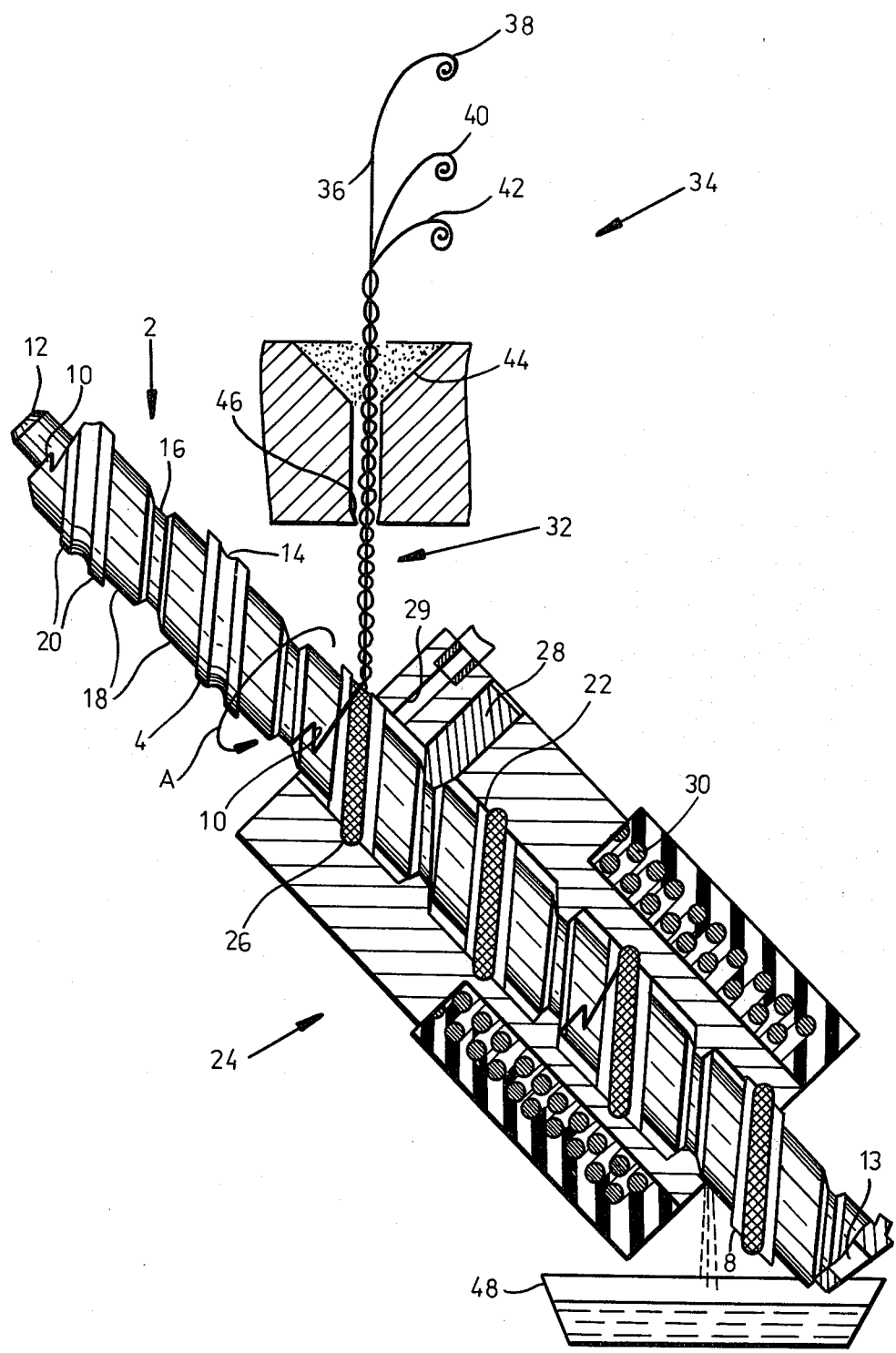

METHOD FOR PRODUCTION OF A HELICAL SPRING FROM A FIBER-REINFORCED PLASTIC

FIELD OF THE INVENTION

The invention relates to a method of and to an apparatus for production of a helical spring from a fiber-reinforced plastic.

BACKGROUND OF THE INVENTION

German Patent Disclosure Document DE-OS No. 30 00 520 teaches such a method for the production of a helical spring reinforced with carbon fibers. There a strand comprising carbon fibers and plastic resin is coiled into a spiral groove of a cylindrical core and is then solidified. The solid spring can then be removed from the core.

In the known method the outer region of the strand not surrounded by the spiral groove is wound with an easily removable and tension proof tape. This winding is relatively expensive and does not assure an accurate cross-section shape of the strand. In addition cross-sections narrowing to the outside such as for example a round cross-section particularly desirable for helical springs cannot be produced.

OBJECTS OF THE INVENTION

It is an object of the present invention to provide an improved method such that with small effort all conventional strand cross-sections with precise cross-sectional shape can be produced.

It is a further object of the invention to provide a relatively uncomplicated apparatus suitable for performing the method.

SUMMARY OF THE INVENTION

According to the invention these objects are attained by providing an outer molding body or stator having an inner spiral groove disposed around a core or rotor, which spiral (helical) groove together with the spiral (helical) groove of the core provides the cross-section profile and the winding geometry of the strand. The core and/or the outer molding body are shifted axially relatively in an amount corresponding to the slope (pitch) of the spiral grooves upon a relative rotation. The strand is fed to the spiral groove of the core before it runs into the spiral groove of the outer molding body.

The strand formed from the reinforcing fibers and the plastic resin is introduced into the spiral groove of the core and then passes into the inner spiral grooves of the outer molding body with precise calibration of the strand cross-section. In a single method step thus the continuity and the cross-sectional shape of the strand are determined in addition to the geometry of the helical spring.

The hardening of the strand should occur inside the molding body in order to assure consistently the dimensional stability of the cross-sectional region determined by the molding body.

A further embodiment particularly suited for mass-production provides that the strand is produced continuously and fed to the spiral groove of the core or rotor that the core is rotated with axial advance by the outer molding body or stator and that the core is formed from several connectable sections which sections are removed after passing of the outer molding body and which are connected again with the sections in front of the molding body. Thereby it is possible to produce helical springs continuously and to cut them to the lengths desired. The sections of the core or respectively rotor having passed the outer molding body or respectively stator are removed for example from the helical spring by unscrewing and are connected again with the sections disposed in front of the stator. The endwindings of the cross-cut helical spring can finally be adjusted up to a slope 0 for example by subsequent heating.

The dimensional stability of the helical spring as well as the wear and the torsional forces between the core and the outer molding body can be influenced favorably by using a plastic resin miscible with the strand material as a rinsing liquid, which is then fed to the strand production. It is to be understood the the plastic resin serving as a rinsing liquid may not be allowed to solidify. It is introduced between the core and the outer molding body for rinsing away of excessive strand material.

An apparatus for carrying out the method comprises an outer molding body or stator provided with a bore, wherein the core or rotor is rotatably guided. A spiral groove forming the cross-sectional shape of the strand with the spiral groove of the core or rotor is milled into the bore. An advancing means (i.e. a thread groove and guide pin) engaging at the core and/or at the outer molding body or stator effects an axial relative shifting conforming to the slopes of the spiral grooves.

An axial advance of the rotor inside of the stator can advantageously be achieved by a thread groove which is disposed between the windings of the spiral groove in the core or rotor and the slope of the thread groove is the same as the slope of the spiral grooves, the thread groove engaging a guide pin of the outer molding body or stator protruding into the bore. claim 7. By way of the thread-like connection in a certain sense the rotor with the strand is screwed through the stator, whereby there is provided an advantageous pulling in of the strand into the spiral grooves and a densification of the material is connected therewith.

BRIEF DESCRIPTION OF THE DRAWING

The invention is described with reference to the appended sole FIGURE of the drawing which shows an apparatus according to the invention with a rotor and a stator for the production of a helical spring.

SPECIFIC DESCRIPTION

A core or respectively a rotor 2 of steel is composed of several sections 4, 6, 8 separated across to the longintudinal axis of the core. The tubular sections 4, 6, 8 are provided in each case at their front side with a protrusion 10, which allows for a bayonet-type rapid connection and for a proper angular coordination of the sections mutually. A bolt 12 attached in each case at the end of the sections, which can be slid into a bore 13 of the in each case next section, assures a concentric guiding of the sections 4, 6, 8 relative to each other.

A semicircular spiral groove 14 with a certain slope is milled into the outer circumference of the rotor 2. A threaded groove 16 is provided between the windings of the spiral groove 14 with the same slope or pitch. On the two sides of the threaded groove 16 are provided spirally surrounding regions 18 recessed in their diameter, which regions are provided with such a width that on both sides of the spiral groove 14 guide surfaces 20 remain.

The rotor 2 is guided in a bore 22 of an outer molding body or respectively of a stator 24 with the guide faces 20. A spiral groove 26 with the same slope (pitch) and mirror symmetrical geometry as the spiral groove 14 of the rotor 2 is milled into the bore 22. A guide pin 28 protruding into the bore 22 is inserted between a winding of the spiral groove 26 and the guide pin 28 in cooperation with the threaded groove 16 of the rotor 2 effects an axial advance corresponding to the slope of the spiral grooves and which guides the two spiral grooves 14, 26 determining the cross-section of the strand in accurate covering relative to each other.

A channel 29 is joined to the bore 22 and rinsing liquid is introduced via the channel 29 filling the recessed regions 18. The rinsing liquid can be provided from a reservoir disposed at a geodetically higher placed location, which is not shown here.

An electrical heating winding 30 is disposed around the stator 24, by way of which the stator 24 can be heated. The rotor 2 can be put into rotation with a drive not shown here such as for example a pinch roll drive in the direction of the arrow in the drawing.

The strand 32 running into the spiral groove 14 of the rotor 2 is produced in a modified pultrusion apparatus 34. The strand 32 comprises a pressure stiff tubing core 36 from polyvinylchloride, which is fed continuously from a coil 38. Endless glass fiber tapes (roving tapes) 40 or respectively 42 are wound around the core 36 with glass fibers directed at +45° and −45° to the core 36. Then the wound strand is soaked or respectively embedded in liquid thermosetting epoxide resin in an impregnating means 44 and is pressed out through a nozzle 46.

The strand 32 runs under rotation of the rotor 2 into the spiral groove 14 and is surrounded by an additional spiral groove 26 and transported through the stator 24. Therewith both the geometry (spiral shape) of the helical spring as well as a calibration of the strand cross-section is effected. Resin exiting from the spiral grooves 14, 26 inside of the stator 24 is squeezed into the recessed regions 18 of the rotor 2. At the same time rinsing liquid from a nonhardening epoxide resin is fed via channel 29. The rinsing liquid effects a frictionless transport of excess strand material from the stator 24 and a decrease in the torsional forces and of the wear between the rotor 2 and the stator 24.

The rinsing liquid dripping after leaving the stator 24 from the rotor 2 into a catch container 48 and possibly separated by a stripping device is fed after addition of a catalyst as a now thermosetting epoxide resin to the impregnating means 44 or employed for the production of the strand 32.

During the rotation of the rotor 2 the stator 24 is heated electrically to 180° C. by way of the heater winding 30 and therewith the strand 32 or respectively the formed helical spring is hardened. It is to be understood the the speed of running through of the strand 32, the plastic resin employed and the process temperature have to be adapted to each other.

After passing through the stator 24 the helical spring and the corresponding section 8 of the rotor 2 are separated from each other. This can be provided by separating the section 8 from the section 6 by a relative rotation in the direction of the arrow and unscrewing the same from the helical spring. The helical spring can be cut before or after the separating of the section 8.

The removed section 8 after cleaning with a separating means containing for example polytetrafluorethylene is sprayed and in a continuous helical spring production again fed to the rotor 2 by connecting to the section 4. The separating means eases both the cleaning as well as the unscrewing of the section from the helical spring.

The end windings of the helical springs can be pulled in after a heating to a temperature above the glass temperature or they can be flattened as to their slope. In order to facilitate the start-up of the apparatus described as well as repairs after operational interferences, the stator 24 is formed from several parts, where the separating planes are running along the center of the bore 22.

The rotor 2 and the stator 24 can be provided instead of with one spiral groove 14 or 26 also with several corresponding spiral grooves, whereby based on the feeding of several strands 32 the throughput can be increased considerably. Of course, also other materials than those described here can be employed for the strand 32. Beside thermosetting plastic resins also thermoplastic plastic materials can be employed as well as reaction plastics hardening at room temperature.

It is to be understood, that upon employing of thermoplastic plastic materials the stator 24 is provided with a corresponding cooling means instead of the heater winding 30. Instead of glass fibers it is also possible to employ other fibers known from composite materials.

I claim:

1. A method of making a helical spring which comprises the steps of:
    rotating an inner cylindrical member formed with an outwardly open helical groove around the axis of said member;
    enclosing said inner member in an outer member formed with an axially extending bore provided with an inwardly open helical groove registering with the outwardly open helical groove to define a closed cross section for a spring to be formed in said grooves;
    feeding a strand of fiber reinforced synthetic resin in a plastically deformable state into said outwardly open groove thereby entraining said strand into said outer member and molding said strand to said cross section between the grooves of said members; and
    axially shifting said members relatively corresponding to the pitch of said grooves during the rotation of said inner member whereby a spring formed from said strand emerges from said outer member on said inner member at an end of said outer member opposite that at which said inner strand was entrained into said outer member.

2. The method defined in claim 1, further comprising the step of hardening said strand at least partially within said outer member.

3. The method defined in claim 2 wherein said strand is produced by winding fiber around a core and impregnating the fiber wound around said core with a thermosettable synthetic resin material before said strand is introduced into said outwardly open groove.

4. The method defined in claim 1, further comprising the step of introducing a nonhardening rinsing liquid between said members for rinsing away excess material from said strand.

5. The method defined in claim 4 wherein said rinsing liquid is a nonhardening synthetic resin miscible with synthetic resin of said strand.

* * * * *